May 26, 1964

M. D. LACKEY ETAL 3,134,628

TILTING DUMPING TRAILER

Filed Jan. 30, 1961

INVENTORS
Marion D. Lackey
Richard H. Evans
Richard L. Sittel
Darrell G. Wortman

BY

ATTORNEY C. M. McKnight

INVENTORS
Marion D. Lackey
Richard H. Evans
Richard L. Sittel
Darrell G. Wortman May 26, 1964

M. D. LACKEY ETAL 3,134,628

TILTING DUMPING TRAILER

Filed Jan. 30, 1961

INVENTORS
Marion D. Lackey
Richard H. Evans
Richard L. Sittel
Darrell G. Wortman

BY

ATTORNEY

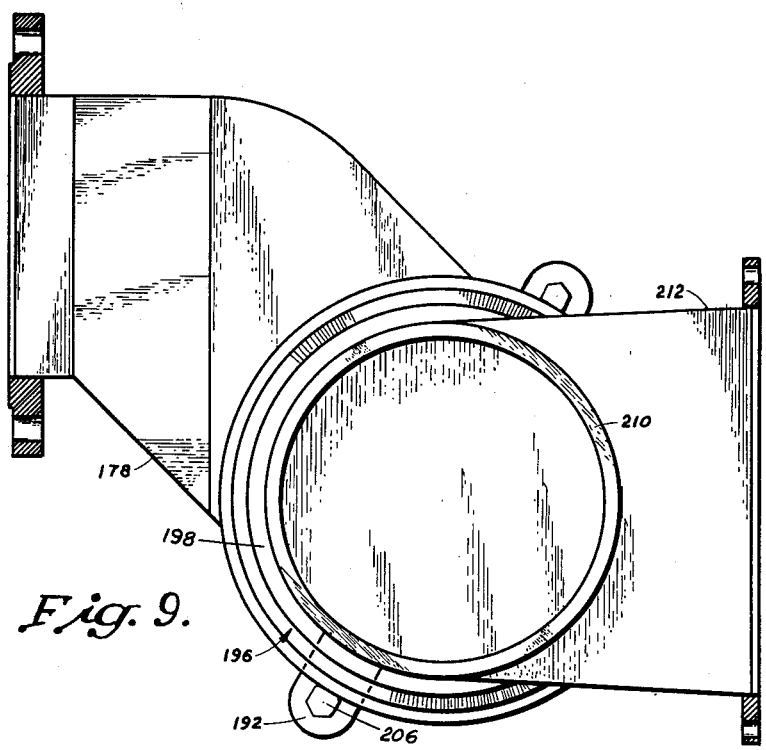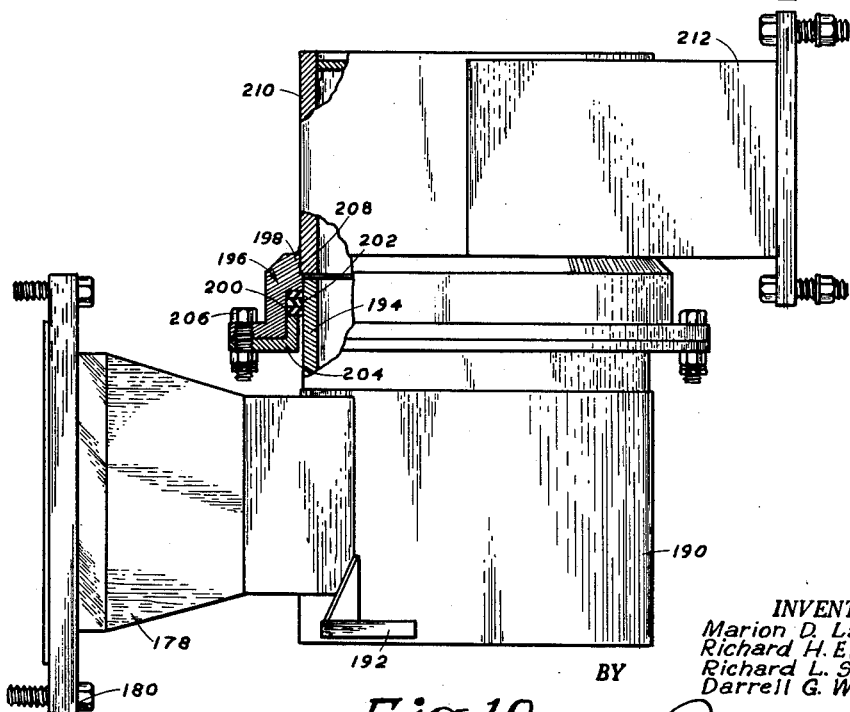

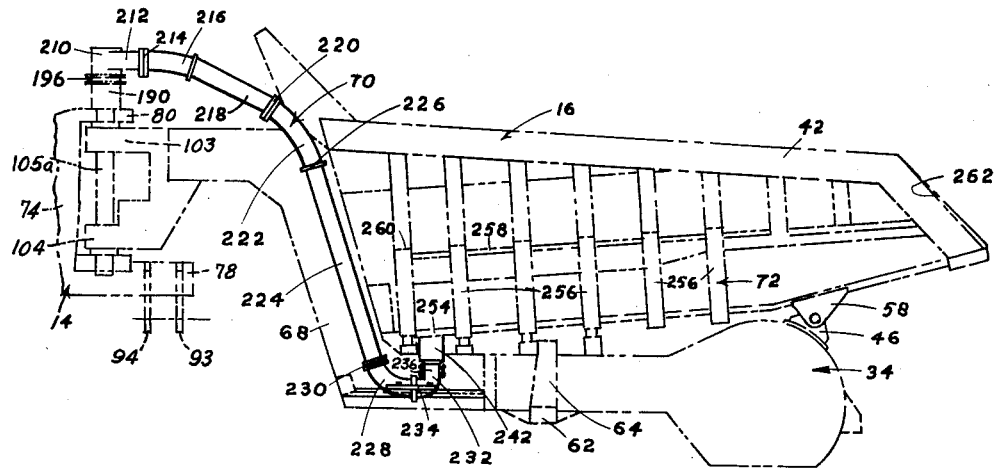
Fig. 11.
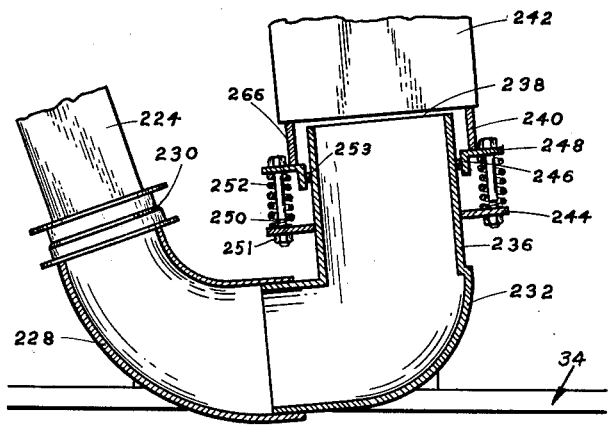
Fig. 12.
INVENTORS
Marion D. Lackey
Richard H. Evans
Richard L. Sittel
Darrell G. Wortman

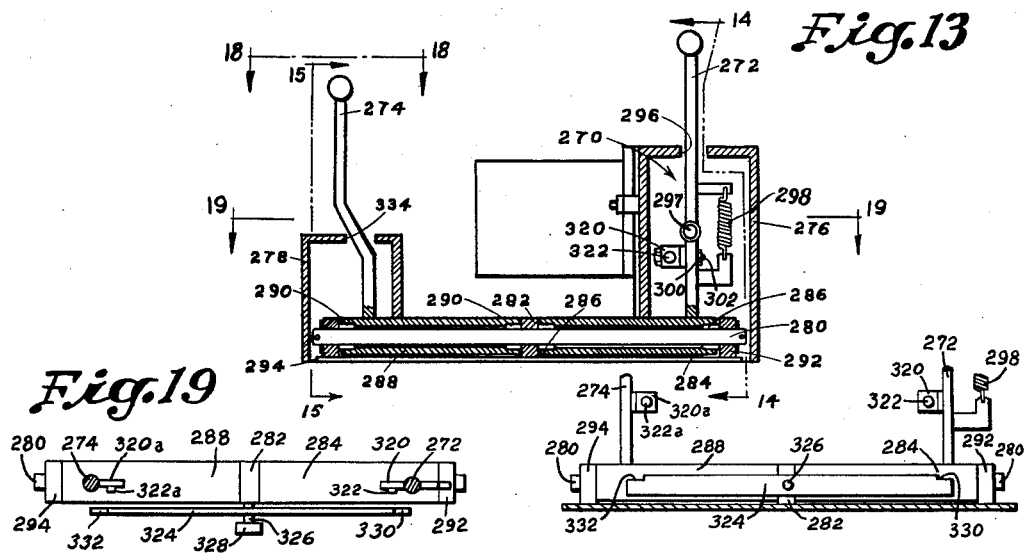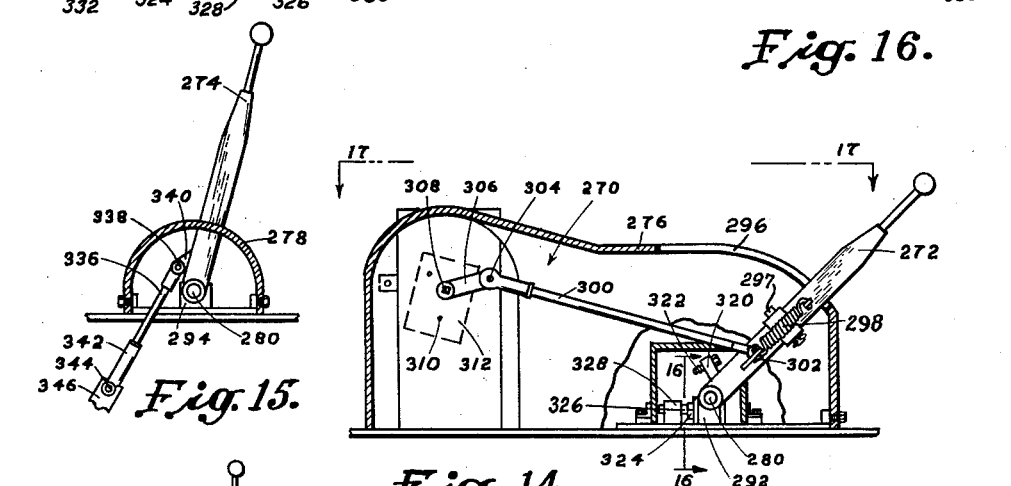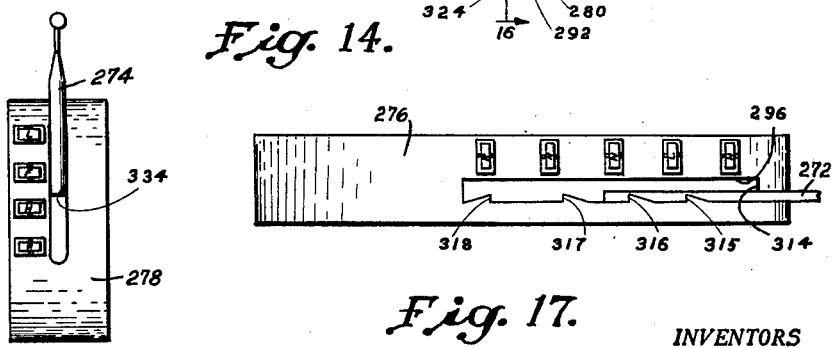

United States Patent Office 3,134,628
Patented May 26, 1964

3,134,628
TILTING DUMPING TRAILER
Marion D. Lackey, Richard H. Evans, Richard L. Sittel, and Darrell G. Wortman, all of Tulsa, Okla., assignors to Unit Rig & Equipment Company, Tulsa, Okla., a corporation of Delaware
Filed Jan. 30, 1961, Ser. No. 85,840
8 Claims. (Cl. 298—21)

This invention relates to improvements in vehicles, and more particularly, but not by way of limitation, to off the road or off-highway vehicular equipment of the dump truck type particularly designed for ease of maneuvering and wherein the exhaust gases of the truck engine are utilized for heating the dump body of the truck.

Off-highway vehicular equipment is utilized in many industries wherein large and heavy load conditions exist, such as in open pit mining and large scale construction operations, and the like. The handling of large quantities of material, such as raw ore or the like, requires equipment sufficiently heavy or strong to lift and transport the bulky material with substantial ease, and large enough to carry great quantities thereof in order to reduce the haulage time and costs. As the equipment becomes of a larger and heavier design, the ease and efficiency of operation thereof decreases accordingly, and the entire design of the equipment creates additional problems. For example, the braking system of such heavy rolling equipment presents a problem in that the weight of the loaded vehicle requires much greater braking power or force for stopping thereof. In addition, the steering mechanism must usually be specially designed for operating equipment of such large proportions. It will be apparent that many problems must be overcome in the design and construction of this type of oversized equipment.

There are many disadvantages of the presently available vehicles of this type. Normally, the operation of extremely large off the road vehicles is different from and more complicated than the operation of trucking equipment constructed on a smaller scale. As a result, not only is the flexibility and ease of manipulation of the large equipment greatly reduced, but it is usually necessary to provide special training for the drivers or operators of the equipment. In addition, many of the heavy or large mining vehicles are in use in areas of extreme climatic conditions, particularly in the northlands wherein the atmospheric temperatures are often extremely low. This frequently results in the freezing of the ore carried in the normally open dump truck bodies, which increases the handling difficulties thereof. It is found in such operation conditions that the ore material tends to freeze to the bed of the dump body. For example, approximately an inch of the material may freeze to the dump body during the hauling of one load, and the frozen material adheres to the body upon the dumping of the load. The next succeeding load may result in the freezing of an additional layer of the material in the dump body. It will be apparent that the increasing build up or accumulation of frozen ore reduces the loading capacity of the equipment and soon results in a greatly decreased efficiency thereof.

The present invention contemplates a novel off-highway vehicle of the dump truck type, preferably having a dump unit pay load size of approximately fifty tons upward, but not limited thereto, and particularly designed and constructed for maneuverability and ease of operation. The vehicle is provided with an efficient electric drive system which frees the driver or operator from shifting, clutching and tachometer watching. The handling or steering of the truck is substantially the same as that involved in the driving of the more conventional smaller trucks or automobiles, thus eliminating the necessity of special training for the operator thereof. The overall design and construction of the vehicle provides for a maneuverability not heretofore possible with rolling equipment of such an excessively large size. The carrying loads of the novel dump truck are considerably greater than that provided with the presently available off-highway equipment of this type, thus reducing the time and expense of haulage. And yet, even with the increased bulk of the equipment, the ease of handling and speed with which the load may be dumped is greatly increased.

Each wheel on the novel vehicle is independently powered, thus eliminating the need for rigid alignment therebetween. The wheels are motorized, thereby eliminating the need of drive axles, transmissions, torque converters and propeller shafts for greatly reducing the drive system maintenance. The motorized wheel drive permits a greater percentage of the engine's power to be transmitted to the tires, which is particularly important in adverse terrain and weather conditions. The independent arrangement of the wheels provides a greater flexibility of operation in the normally rough terrain wherein the off-highway vehicles are frequently utilized. The tractor is connected to the trailer by a king pin hitch whereby independent oscillation of the tractor and trailer is provided for maximum maneuverability of the oversized vehicle. In addition, dynamic braking is utilized in lieu of the usual friction type braking, which reduces mechanical wear and provides a more efficient braking for the excessive weight and size of the vehicle. Furthermore, the novel vehicle is particularly designed and constructed to utilize the exhaust gases from the truck engine to heat the dump body for substantially precluding any freezing of the pay load carried therein. This is of particular importance in utilization thereof in the northern climates of the world where many mining operations, and the like, are located.

It is an important object of this invention to provide a novel off-highway vehicle of a substantially greater size than presently available equipment for reducing the time and expense of haulage operations.

It is another object of this invention to provide an off-highway vehicle of a substantially large size and having an increased maneuverability of handling and ease of operation.

It is still another object of this invention to provide an off-highway vehicle wherein the tractor and trailer portions thereof are designed for independent oscillation to increase the flexibility of operation thereof.

Another object of this invention is to provide an excessively large off-highway vehicle wherein the steering is substantially similar to the steering of the usual truck or automobile, thereby eliminating the necessity of special training for the operator thereof.

Still another object of this invention is to provide an off-highway vehicle wherein the wheels thereof are independently powered to eliminate rigid alignment therebetween for increasing the flexibility of operation thereof.

A further object of this invention is to provide a novel off-highway vehicle of the dump truck type wherein the dump body is heated to preclude freezing of the material carried thereby.

A still further object of this invention is to provide an off-highway vehicle of the dump truck type wherein the normally wasted exhaust gases of the truck or tractor engine are utilized for the heating of the dump body.

It is a still further object of this invention to provide a novel off-highway vehicle having a safety feature precluding the accidental retaining of the vehicle engine in a reverse driving position during the dumping operation.

And a still further object of this invention is to provide a novel off-highway dump truck which is simple and efficient in operation and economical and durable in construction.

Other objects and advantages of the invention will be evident from the following detailed description, read in conjunction with the accompanying drawings, which illustrate our invention.

In the drawings:

FIGURE 9 is a plan view of the rotating seal assembly of the exhaust system.

FIGURE 10 is a side elevational view partly in section of the seal assembly depicted in FIG. 9.

FIGURE 11 is a side elevational view of an additional portion of the exhaust system with portions of the vehicle shown in broken lines for purposes of illustration.

FIGURE 12 is an enlarged sectional view of the snap seal assembly between the exhaust system and the dump body.

FIGURE 13 is a sectional elevational view of the shifting apparatus.

FIGURE 14 is a sectional view of the shifting apparatus taken on line 14—14 of FIG. 13.

FIGURE 15 is a sectional view of the shifting apparatus taken on line 15—15 of FIG. 13.

FIGURE 16 is a sectional view taken on line 16—16 of FIG. 14.

FIGURE 17 is a plan view of the shifting apparatus taken on line 17—17 of FIG. 14.

FIGURE 18 is a plan view of the shifting apparatus taken on line 18—18 of FIG. 14.

FIGURE 19 is a plan view taken on line 19—19 of FIGURE 13 with the outer housing eliminated for purposes of illustration.

Figure 1:
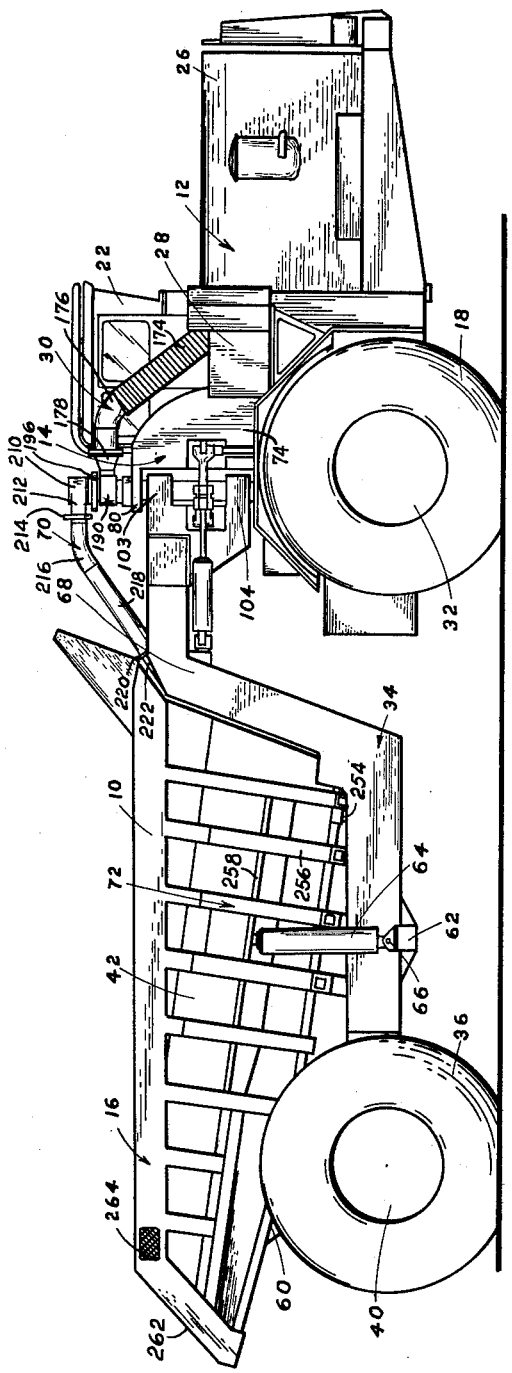
FIGURE 1 is a side elevational view of an off-highway vehicle embodying the invention.
Figure 2:
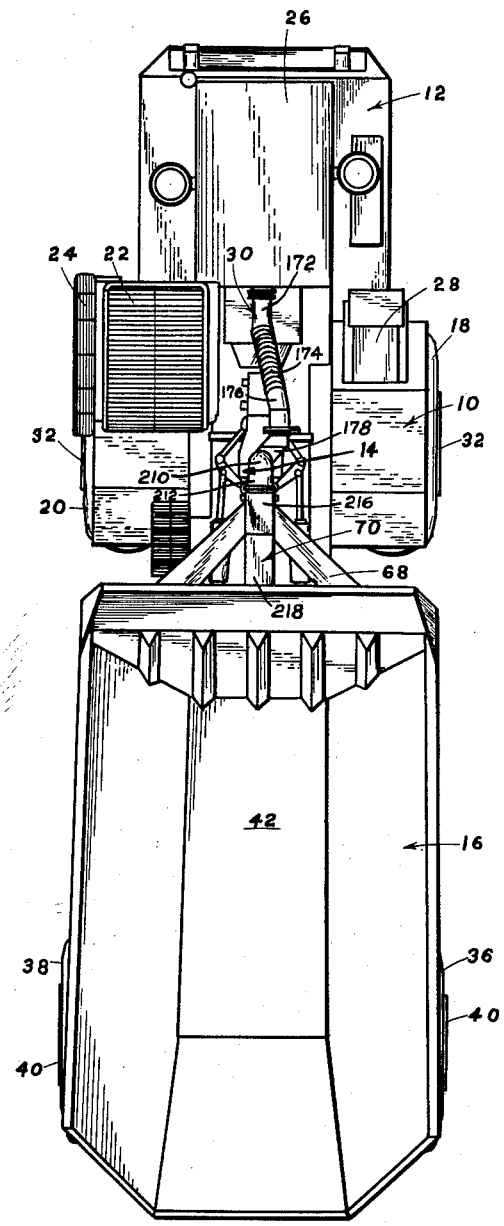
FIGURE 2 is a plan view of an off-highway vehicle embodying the invention.
Figure 3:
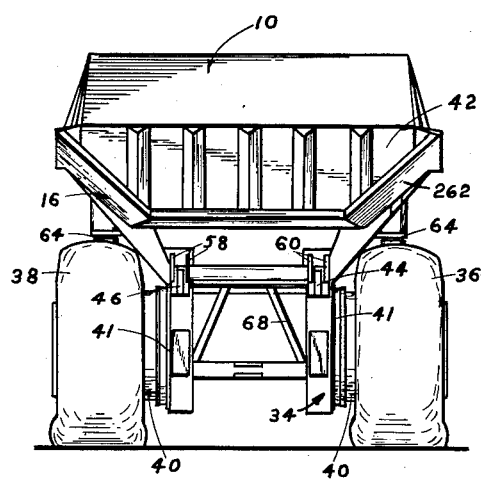
FIGURE 3 is a rear elevational view of an off-highway vehicle embodying the invention.

Referring to the drawings in detail, and particularly FIGS. 1 through 6, an off-highway vehicle generally indicated at 10 is preferably of the dump truck type, but not limited thereto. The truck 10 comprises three basic components, namely a front cab or tractor section 12, a central or king post mid-section 14, and a rear trailer or dump body section 16. These three components are united and cooperate to provide the complete truck or vehicle 10 as will be hereinafter set forth.

*Front Tractor Section*

The tractor 12 is preferably provided with two wheels 18 and 20 each having a rim diameter ranging from approximately thirty-three inches to forty-five inches, but not limited thereto. A cab portion 22 is disposed above the wheels 18 and 20 and is preferably off-set from the longitudinal center of the tractor 12 to provide clearance for operating equipment as will be hereinafter set forth. The usual running board or step 24 (FIG. 2) is provided adjacent the cab 22 and substantially directly above the wheel 20 in order to facilitate access to the cab. It will be apparent that the overall excessive size of the vehicle 10 requires auxiliary equipment, such as ladders, hand or support rails, and the like (not shown) for cooperating with the step 24 to facilitate access to the interior of the cab 22 by the driver or operator of the vehicle 10.

The tractor section 12 is further provided with a forwardly extending housing 26 for encasing the tractor or truck engine (not shown) and a generator (not shown). The generator is preferably directly coupled to the engine for operation thereby in any well known manner, but not limited thereto. A housing 28 may be mounted on the tractor 12 above the wheel 18 and oppositely disposed from the cab 22 for encasing and supporting a suitable blower, or the like (not shown) for circulating clean, cool air to the generator. The blower may be mechanically driven from an engine power take-off (not shown) or the generator tail shaft (not shown), or may be electrically driven, as desired. A portion of the exhaust system, generally indicated at 30 is also carried by the tractor section 12 as will be hereinafter set forth in detail.

An entire motor 32 is mounted within the rim of each wheel 18 and 20 and each of the wheels is bolted (not shown) directly to the side or frame of the tractor section 12. The motors 32 are supplied with electric power from the engine driven generator hereinbefore set forth. Thus, each of the wheels 18 and 20 is independently secured to the tractor 12, and there is no need for axles, transmissions, drive shafts, or the like, therefor. The aforementioned blower is preferably utilized to provide the ventilating air for the motors 32 as well as for the generator. This motorized wheel arrangement permits an all-wheel drive for the tractor section 12.

*Rear Dump Body Section*

The rear section 16 is secured to the tractor section 12 by the king post hinge section 14, as will be hereinafter set forth, and comprises a superstructure or fabricated frame 34 preferably having two wheels 36 and 38 carried thereby. The wheels 36 and 38 are substantially identical with the wheels 18 and 20 and a motor 40 is similarly mounted within the rim of each of the wheels 36 and 38. The wheels are bolted, or otherwise secured directly to the frame 34 as shown at 41 (FIG. 3), and are supplied with electric power from the engine driven generator. Thus, all the wheels of the vehicle 10 are independently mounted thereon and the motorized arrangement thereof provides for an all-wheel drive for the entire vehicle 10 with the use of a single truck engine.

A dump body 42 is pivotally secured to the frame 34 in the proximity of the wheels 36 and 38 by a pair of spaced upstanding boss members 44 and 46 (FIG. 3) rigidly secured to the frame 34 and each cooperating with pairs of spaced apertured flange members 58 and 60 carried by the dump body 42. An outwardly extending flange 62 is secured to each side of the frame 34, only one of which is shown in FIG. 1, each for supporting a hydraulic or pneumatic cylinder 64 thereon. The cylinders 64 are disposed forwardly of the wheels 36 and 38 and the pivot connection of the dump body 42 with the frame 34. Each cylinder 64 is pivotally secured at one end as at 66 to the flange 62, and is secured at the opposite end to the dump body 42 in any well known manner (not shown). The application of hydraulic or pneumatic fluid to the cylinder 64, as is well known, will expand the cylinder 64 for pivoting the dump body 42 in a direction for dumping the load (not shown) carried thereby. Conversely, withdrawal of the fluid from the cylinder 64 will pivot the dump body 42 in a reverse direction for restoring the dump body to the normal substantially horizontal disposition thereof, as depicted in FIG. 1.

The frame 34 is provided with a forwardly extending angular yoke member 68 adapted for connection with the king post hinge section 14 in a manner as will be hereinafter set forth whereby independent oscillation or lateral rocking of the tractor section 12 and the trailer section 16 is provided to increase or facilitate the maneuverability of the vehicle 10. In addition, a second portion or the exhaust system, generally indicated at 70, is carried by the frame 34, and is in communication with the exhaust system portion 30 carried by the tractor section 12 as will be hereinafter set forth.

The dump body 42 is provided with a passageway network or a plurality of horizontally and vertically extending channels and passageways generally indicated at 72 and as will be hereinafter set forth in detail. The passageway network 72 is in communication with the second exhaust system portion 70 to receive the exhaust gases therefrom. It will be apparent that the exhaust gases circulating through the passageway network 72 will provide heat to the dump body 42 for precluding any freezing of the load (not shown) carried therein.

Dynamic braking is utilized for the vehicle 10 as is well known in vehicles of this type. In the dynamic braking system, the motors 32 and 40 operate as generators and the vehicle's energy of motion is dissipated as heat in high capacity, air cooled resistors (not shown). The control voltage is supplied to the dynamic braking circuit by the usual twenty-four volt vehicle batteries (not shown), and the control voltage is regulated by a manually operated potentiometer (not shown). The control voltage from the potentiometer energizes the generator self field coils (not shown) to control the generator excitation, and this in turn varies the main generator output voltage. The controlled generator voltage regulates the field excitation of the wheel motors 32 and 40, which in turn regulates the current developed by the motors while they are acting as generators. The motor current flows through the high capacity resistors (not shown), which opposes the flow of current. This imposes a resisting torque on the motor armature (not shown), which is braking effort. Manual application of the dynamic brake actuates the potentiometer to increase the self field excitation, the main generator voltage, the motor field excitation, and the braking effort. The braking effort varies with the speed of the vehicle 10, which is determined by the speed of the wheel motors 32 and 40, but the generator speed is essentially constant, which will not vary the braking effort.

*King Post Hinge Section*

Figure 5:
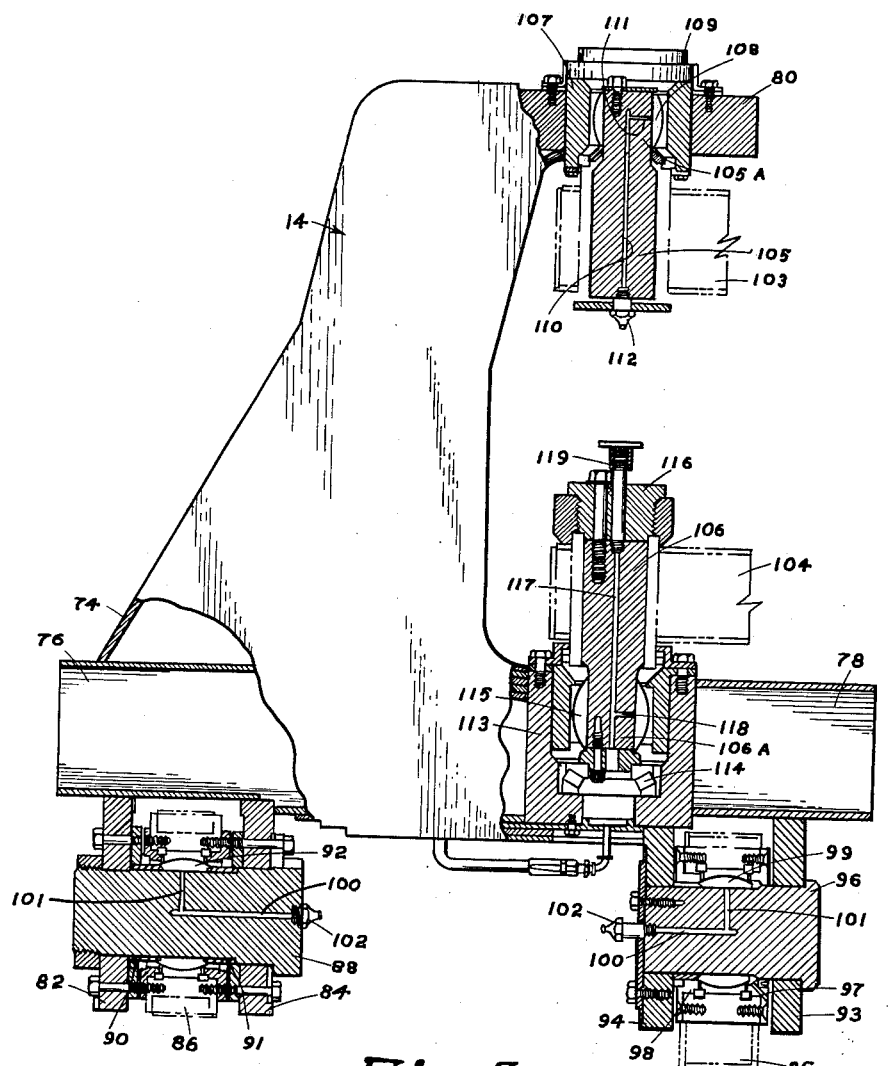
FIGURE 5 is an enlarged side elevational view of the king post hinge or mid-sectional component of the novel vehicle with portions thereof in section for purposes of illustration.

Referring particularly to FIG. 5, the king post hinge or mid-section 14 comprises a substantially yoke shaped frame 74 provided with a forwardly extending leg member or brace 76 and a rearwardly extending brace or leg 78 which is preferably in substantial longitudinal alignment with the leg member 76. An upper leg member 80 extends rearwardly from the frame 74 and is spaced above the leg 78 for a purpose as will be hereinafter set forth. A pair of spaced downwardly extending flanges 82 and 84 are welded or rigidly secured to the front leg 76 for receiving a cross structure member 86 (shown in dashed lines) of the front cab section 12 therebetween. A shaft 88 extends between the flanges 82 and 94 and is secured therethrough in any well known manner. Suitable spaced bearing retainer members 90 and 91 are preferably disposed around the shaft 88 between the flanges 82 and 84. The shaft 88 also extends through the cross structure 86 and is journalled therein by a self-aligning member 92 disposed between the retainer rings 90 and 91.

In a similar manner, the rearwardly extending leg 78 is provided with a pair of downwardly extending flanges 93 and 94 for receiving a cross structure member 95 (shown in dashed lines) of the front cab section 12 therebetween. The cross structure members 86 and 95 may be interconnected in any well known manner (not shown), if desired. A shaft 96 extends between the flanges 93 and 94 and is secured therethrough in any well known manner. Suitable spaced bearing retainer members 97 and 98 are preferably disposed around the shaft 96 between the flanges 93 and 94. The shaft 96 also extends through the cross structural member 95 and is journalled therein by a self-aligning bearing 99. The shaft 96 is in axial alignment with the shaft 88 and the two aligned shafts function as the rotational axis for the oscillation of the front cab section 12. It may be desirable to provide a single elongated shaft (not shown) in lieu of the two aligned shafts 88 and 96. It will be apparent that the front cab section 12 may thus rotate laterally independently of both the rear trailer section 16 and the midsection or king post hinge section 14.

A longitudinally extending passageway 100 in communication with a radial channel or passageway 101 may be provided in each of the shafts 88 and 96, as shown in FIG. 5. The passageways 101 terminate at the self-aligning bearing associated with the respective shafts 88 and 96, and a suitable grease fitting member 102 is provided for each passageway 100 in order that lubricant may be supplied to the bearings 92 and 99, as is well known.

Figure 4:
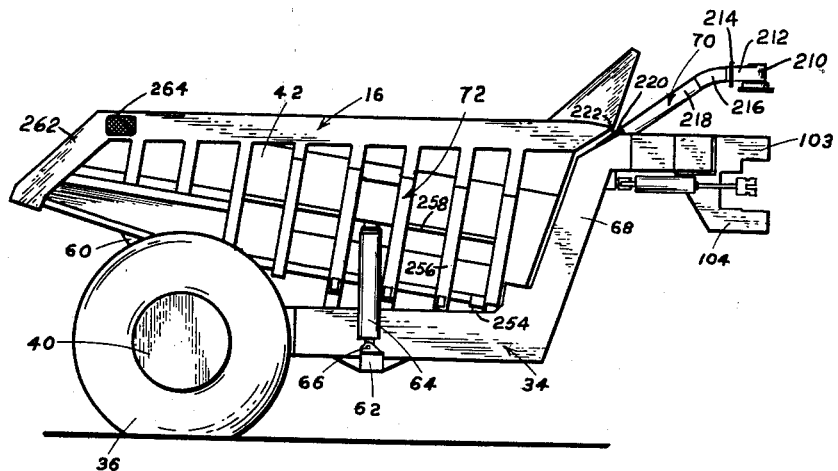
FIGURE 4 is a side elevational view of the rear component of the novel dump truck.
Figure 6:
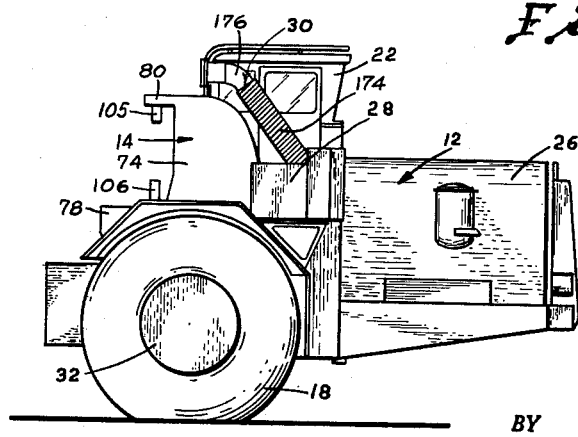
FIGURE 6 is a side elevational view of the front component of the vehicle.

The yoke member 68 of the trailer frame 34 extends forwardly, as shown in FIGS. 1 and 4, and is bifurcated at the front end thereof or provided with spaced apertured arms 103 and 104 adapted for disposition between the spaced leg members 78 and 80 of the hinge section frame 74, as shown in dashed lines in FIG. 5. A pivot pin member 105 is carried by the upper leg member 80 and extends downwardly through the apertured arm 103. A second pivot pin 106 is carried by the lower leg member 78 in substantial axial alignment with the pin 105 and extends upwardly through the apertured arm 104. It will be apparent that a single pivot pin 105a (FIGURE 11) extending between the legs 78 and 80 may be utilized in lieu of the two pivot pins 105 and 106, if desired, but the arrangement depicted herein has proven to be more practical. The pivot pins 105 and 106 may be journalled in the arms 103 and 104, respectively, in any suitable manner (not shown) whereby the yoke member 68 may rotate therearound, as is well known.

The upper end 105a of the pivot pin 105 is disposed within a suitable bearing housing 107 which is bolted or otherwise secured to the upper leg 80. A self-aligning bearing 108 is disposed around the upper end 105a of the pin 105 and is retained within the housing 107 in any well known manner. A cover 109 is secured to the arm 80 for enclosing the upper end 105a of the pin 105 and housing 107. The exhaust system portions 30 and 70 are interconnected and secured above the cover member 109 by suitable bolts (not shown) in a manner as will be hereinafter set forth. A longitudinal bore 110 extends into the pin 105 into communication with a radial bore 111 which terminates at the bearing 108. A suitable grease fitting 112 is provided for the bore 110 whereby a lubricant may be supplied to the bearing 108.

The lower end 106a of the pivot pin 106 is disposed within a bearing housing 113 which is bolted or otherwise secured to the lower leg 78, and is supported therein by a suitable thrust bearing 114. A self-aligning bearing 115 is disposed around the end 106a of the pin 106 and is retained within the housing 113 in any suitable manner. A lock nut 116 is provided at the upper end of the pin 106 for securing the pin in position through the arm 104. A longitudinal passageway 117 extends through the nut 116 and pin 106 into communication with the thrust bearing 114, and also communicates with a radial passageway 118 which terminates at the bearing 115. A suitable grease fitting 119 is provided in the open end of the passageway 117 whereby a lubricant may be supplied to both the thrust bearing 114 and self-aligning bearing 115.

In this manner, the yoke member 68 is pivotally secured to the king post hinge section 14 whereby the trailer section 16 may rotate on a substantially horizontal plane with respect thereto. In addition, the self-aligning bearing members 108 and 115 compensate for any movement of the trailer section 16 which may occur. The king post hinge section 14 functions to unite the tractor section 12 and trailer section 16 in such a manner that the vehicle 10 may be readily maneuvered around corners, and the like, and provides for independent oscillation of the tractor 12 with respect to the king hinge section 14 and trailer 16 for facilitating handling of the vehicle over rough terrain. As a result, the driving or steering of the vehicle 10 is substantially the same as steering and handling of the usual smaller truck or automobile.

*Exhaust System*

Figure 7:
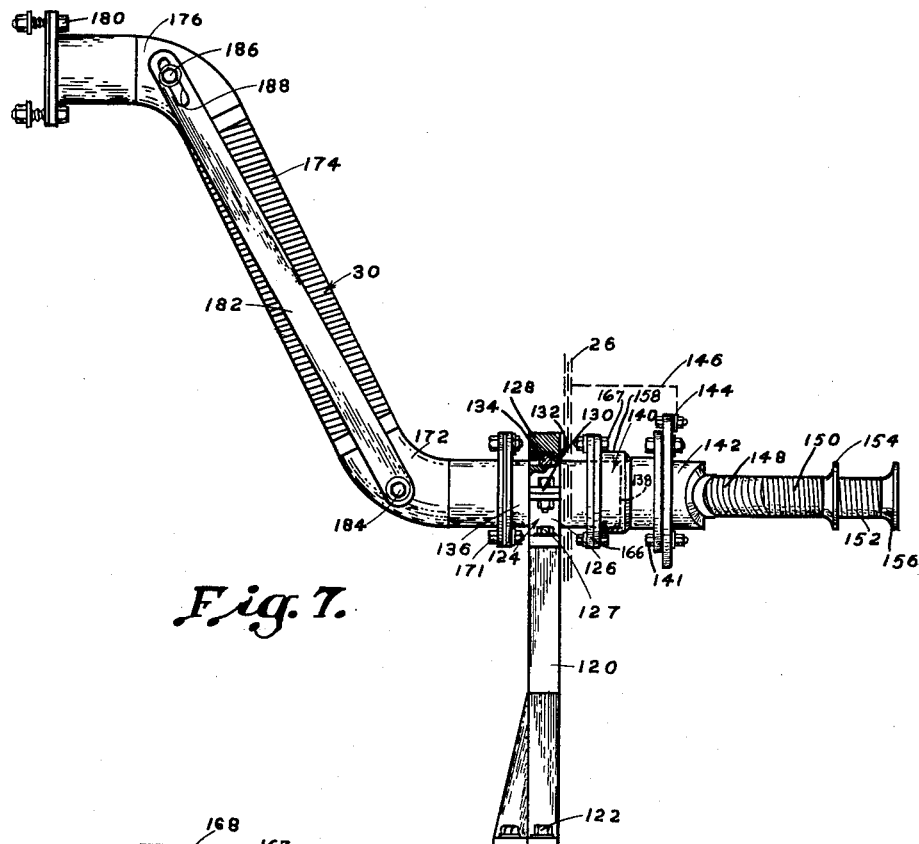
FIGURE 7 is an enlarged elevational view of a portion of the exhaust system of the vehicle.
Figure 8:
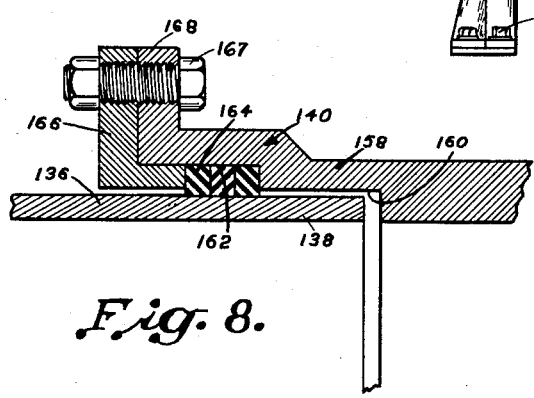
FIGURE 8 is an enlarged sectional elevational view of a portion of a sealing unit utilized in the exhaust system.

Referring now to FIGS. 7 through 12, and particularly FIG. 7, the forward section or front portion 30 of the exhaust system is carried by the tractor 12, as hereinbefore set forth. A suitable upstanding support member 120 is secured to the tractor section 12 in any well known manner, such as by bolts 122, or the like, for receiving a split bearing member 124. The bearing or sleeve member 124 preferably comprises a lower half section 126 bolted at 127 or otherwise secured to the support 120, and an upper half section 128 bolted, or removably secured at 130 to the lower portion 126. The support member 120 is preferably disposed slightly rearwardly of the engine housing 26 (indicated in dotted lines in FIG. 7) and cooperates with the bearing 124 for supporting the exhaust system 30 on the tractor section 12.

The bearing 124 is provided with an annular recess or groove 132 on the inner periphery thereof for receiving an outwardly extending radial shoulder or flange 134 provided on the outer periphery of a substantially straight exhaust pipe section 136. The shoulder 134 cooperates with the groove 132 for positioning the sleeve or pipe 136 within the bearing 124 and provides for rotation of the pipe 136 with respect thereto, for a purpose as will be hereinafter set forth. The right hand end 138 (FIG. 7) of the pipe 136, as viewed in the drawings, preferably extends into the interior of the engine housing 26. A dynamic sealing unit 140 is disposed around the end portion 138 and is rigidly bolted at 141 or otherwise secured to a stationary flanged sleeve member 142. The sleeve 142 may be bolted at 144 to any suitable support member, such as the firewall 146 of the housing 26 and generally indicated in dashed lines in FIG. 7. The stationary sleeve 142 is provided with a forwardly extending flexible exhaust pipe member 148 having a pair of diverging flexible pipe members 150 and 152 carried thereby. The pipe 148 and pipes 150 and 152 are interconnected in a substantially Y-shaped configuration. The pipes 150 and 152 are provided with flanged end portions 154 and 156, respectively, for connection with the dual or two exhaust ports (not shown) of the usual turbo-charger (not shown) which is normally in communication with the exhaust outlet of the tractor engine (not shown). Thus, the exhaust gases from the engine are directed through the turbo-charger, and into the twin or two converging pipe members 150 and 152 from whence the exhaust gases converge in the single conduit 148. The tubes or pipes 148, 150 and 152 are preferably constructed from flexible metallic tubing in order to compensate for expansion and contraction of the metal from the heat of the exhaust gases passing therethrough.

The sealing unit 140 comprises a tubular sleeve or body portion 158 (FIG. 8) secured to the stationary sleeve 142 and having an annular recess 160 on the inner periphery thereof for receiving the end portion 138 of the pipe 136 therein. An annular groove 162 is provided in the inner periphery of the sleeve 158 conterminous with the recess 160 for receiving a plurality of annular packing members or sealing rings 164. The packing rings 164 are interposed between the sleeve 158 and pipe 136 to preclude leakage of fluid therebetween. A flanged retaining ring 166 is secured to an outwardly extending flange 168 provided on the sleeve 158 by a plurality of spaced bolts 167, and bears against the packing rings 164 for retaining the rings 164 within the groove 162 and in sealing engagement with the outer periphery of the pipe 136. It will be apparent that the retaining ring 166 may be threadly secured within the groove 162 for maintaining the packing members 164 in a sealing position, if desired, in lieu of the bolted engagement with the flange 168. The sleeve 158 is held stationary through the rigid connection with the member 142 whereas the pipe 136 is free to rotate through the cooperation of the bearing member 124 during the oscillation of the tractor 12. The sealing members 164 provide a dynamic seal to efficiently preclude any leakage of fluid between the rotatable pipe 136 and the stationary sleeve 158. It will also be apparent from FIG. 8 that the groove 160 is sufficiently long to permit a certain amount of longitudinal movement between the pipe 136 and the sleeve 158, which may occur due to the expansion and contraction of the pipe 136 and sleeve 158 from the heat of the exhaust gases passing therethrough.

The pipe 136 extends rearwardly, or in a left hand direction as viewed in FIG. 7, from the support member 120, and is bolted, or the like, at 171 to an angular or elbow pipe section 172, which in turn is secured in any suitable manner, such as welding, to an elongated flexible metallic tubing 174. The pipe 174 preferably extends upwardly at an angle from the elbow 172 for connection with the exhaust section 70 in a manner as will be hereinafter set forth. The pipe section 174 is preferably constructed of flexible tubing in order to compensate for the independent oscillation or lateral rocking of the tractor section 12 with respect to the trailer section 16. The upper end of the flexible pipe 174 is suitably secured to a second angular or elbow pipe section 176 which is secured to a conduit member 178 (FIG. 9) by a plurality of spaced bolts 180. The conduit member 178 is rigidly secured to the king post hinge section 14 in a manner as will be hereinafter set forth. The exhaust section 30 may be of a unitary construction instead of comprising a plurality of connected sections, but the construction shown herein has proven to be more practical in the manufacture or fabrication thereof. It will be apparent that upon oscillation of the tractor section 12, the pipe section 136 will rotate within the bearing 124, and there may be a tendency for the flexible tubing 174 to twist, which is undesirable.

In order to prclude twisting of the tubing 174, a rigid arm or brace member 182 is pivotally secured at one end to the elbow 172 by a suitable pivot connection 184. The opposed end of the brace 182 is secured to the second elbow section 176 by a stud member 186 provided in the arm 182. A second rigid arm member (not shown) similar to the arm or brace 182 may be oppositely disposed therefrom, if desired. The cooperating stud 186 and lost motion slot 188 provide for variation of the length of the flexible tubing 174 during oscillation of the tractor 12, and the brace member 182 transfer the rotational movement of the elbow 172 to the elbow 176 while substantially precluding any twisting of the tubing 174, thus greatly reducing any possible breakage or damage therefrom to the flexible tubing 174.

Referring now to FIGS. 9 and 10, the conduit 178, which is bolted to the elbow 176 by the bolts 180, as hereinbefore set forth, extends into communication with a substantially vertically disposed sleeve 190. The longitudinal axis of the sleeve 190 is preferably in substantial alignment with the axis of the king post. The conduit 178 is preferably welded to the sleeve 190, and an aperture (not shown) provided in the side wall of the sleeve 190 is open to the interior of the conduit 178 whereby the exhaust gases may pass into the vertical sleeve 190. A plurality of outwardly extending apertured lugs or flanges 192 are secured to the outer periphery of the sleeve 190 for receiving bolts (not shown) therethrough in order to secure the sleeve 190 rigidly to the king post hinge frame structure 74 above the cover member 109. Thus, the sleeve 190 remains stationary with respect to the king post frame 74. The upper end 194 of the sleeve 190 is preferably of a slightly reduced outer diameter for receiving a rotating seal unit 196 thereon.

The sealing unit 196 comprises a flanged sleeve member 198 provided with an annular groove or recess 200 on the inner periphery thereof for receiving a plurality of annular packing rings or sealing members 202. The packing rings 202 are interposed between the sleeve 198 and the reduced neck portion 194 of the sleeve 190 for precluding leakage of fluid therebetween. A retaining ring 204 may be secured to the sleeve 198 in any suitable manner, such as a plurality of spaced bolts 206, and bears against the sealing members 202 for maintaining a sealing engagement thereof around the outer periphery of the sleeve 190. The sleeve 198 is further provided with an annular recess 208 spaced from the groove 200 for receiving one end of a rotatable sleeve 210 therein. The ring or sleeve 198 is preferably welded or otherwise rigidly secured to the sleeve 210 for rotation simultaneously therewith. The entire sealing unit 196 is therefore rotatable with respect to the sleeve 190, and the sealing members 202 provide a dynamic seal for efficiently precluding leakage of fluid between the rotatable sleeve 210 and the stationary sleeve 190. A substantially horizontally disposed 212 is welded, or the like, to the sleeve 210, and an aperture (not shown) provided in the side wall of the sleeve 210 establishes communication between the interior of the sleeve 210 and the conduit 212. The conduit 212 is bolted or otherwise secured at 214 (FIG. 11) to the rear exhaust system portion 70 which is carried by the trailer section 16. In this manner, the exhaust gases from the truck engine are directed rearwardly from the vehicle engine to the trailer section 16 for a purpose as will be hereinafter set forth.

Referring now to FIGS. 11 and 12, the exhaust system portion 70 is depicted in solid lines in FIG. 11 with the trailer section 16 and a portion of the king post hinge section 14 depicted in dashed lines for purposes of illustration. The wheels 36 and 38 have been omitted in FIG. 11 in order to more clearly depict the arrangement of the exhaust system section 70. The exhaust portion 70 comprises a conduit section 216 rigidly secured to the conduit 212 at 214, as hereinbefore set forth, and extends into communication with a second similar conduit member 218. The conduit 218 is preferably disposed at an angle as shown in FIG. 11 and is rigidly secured at 220 to an angular or elbow conduit section 222. The elbow member 222 is preferably rigidly secured to the yoke portion 68 of the frame 34 in any suitable manner, such as a strap member (not shown) disposed around the conduit 222 and bolted to the member 68. An elongated substantially straight conduit 224 is secured to the conduit 222 as at 226 and preferably extends along the yoke member 68 to a position spaced slightly below the lower extremity of the dump body 42. The conduit 224 may be secured to the yoke member 68 in any suitable manner, as hereinbefore set forth.

The complementary conduit members 216, 218, 222 and 224 are preferably of a substantially rectangular cross sectional configuration, but not limited thereto, and it will be apparent that the conduits may be of a unitary structure in lieu of the connected individual conduit members, if desired. It has been found that the provision of a plurality of separate conduit members rigidly secured together in this manner greatly facilitates the fabrication or manufacture of the exhaust portion 70, as is well known.

An angular or elbow conduit member 228 is secured to the lower end of the conduit 224 by any suitable coupling member 230, or the like. A second complementary angled or elbow conduit 232 is secured to the elbow 228 in any suitable manner, and both the elbow fittings or conduits 228 and 232 are rigidly secured to the frame 34 by a brace or bracket 234, or the like. Thus, the exhaust portion 70 is secured to the frame 34 and remains stationary with respect thereto. The upwardly extending leg portion 236 (FIG. 12) of the elbow conduit 232 is preferably of a substantially circular cross sectional configuration, but not limited thereto, and the upper end 238 thereof is open and is slidably or removably disposed within a sleeve or ring member 240, preferably of a slightly larger diameter than the leg portion 236. The ring member 240 is carried by a downwardly extending apertured boss member 242 which is an integral portion of the dump body 42.

An annular ring or flange 244 is welded or otherwise rigidly secured around the outer periphery of the leg portion 236 and is spaced below the open end 238 thereof, as clearly shown in FIG. 12. An annular sleeve member 246 is loosely disposed around the leg portion 236 above the ring 244, and is provided with an outwardly extending circumferential flange 248. The flange 248 is resiliently retained in spaced relation to the ring 244 by a plurality of spaced stud members 250 each having a helical spring 252 disposed therearound. A nut member 251, or other suitable stop member is secured to the upper end of each of the studs 250, as viewed in FIG. 12, for limiting the extreme upward movement of the flange 248 and sleeve 246. An annular sealing member 253 is interposed between the inner periphery of the sleeve 246 and the outer periphery of the leg portion 236 for precluding leakage of fluid therebetween. The sealing member 253 may be disposed in an annular groove (not shown) provided in either the sleeve 246 or leg portion 236, if desired. It will thus be apparent that the exhaust gases from the vehicle engine are transmitted or directed from the vehicle engine through the exhaust system portions 30 and 70 and into the apertured boss member 242 of the dump body 42.

The apertured boss member 242 is in open communication with the passageway system 72 provided in the dump body 42. The passageway system 72 comprises a plurality of substantially longitudinally extending channels 254 (FIG. 11), at least one of which is open directly to the apertured boss 242 for receiving the exhaust gases therefrom. The passageway network 72 further comprises a plurality of spaced substantially upwardly extending channels 256 provided on both the upright sides of the dump body 42 and in open communication with the longitudinally extending channels 254. It will be apparent that a plurality of transversely extending channels (not shown) are also provided across the bottom of the dump body 42 and are in open communication with the longitudinal channels 254 and the upright channels 256 for facilitating the dispersion of the exhaust gases therethrough. Additional longitudinally extending channels 258 are spaced above the lower channels 254 and are in open communication with the upright channels 256 for receiving the exhaust gases therefrom. The upright channels 256 are preferably blocked or plugged by a baffle 260, or the like, slightly above the upper longitudinal channels 258 for limiting the upward flow of the warm or hot exhaust gases whereby the gases will be directed into the horizontal or longitudinal channels 258. The upper longitudinal channels 258 terminate at the rear of the dump body 42 in communication with an upwardly and angularly extending passageway 262. Both the opposed sides of the body 42 are provided with the angular passageway 262 and the complementary passageways 262 may be in communication through a transversely extending channel (not shown) provided across the bottom of the body 42, if desired. The passageways 262 direct the exhaust gases to an exhaust port 264 (FIG. 1) for discharge thereof from the vehicle 10. Of course, a plurality of exhaust ports 264 may be provided, but it has been found that a single exhaust port provides better visibility.

The exhaust gases coming into the passageway network 72 tend to seek the line or course of least resistance, and readily disperse generally throughout the entire passageway system 72. However, it has been found that a greater portion of the hot gases tend to remain or collect in the lower portions of the passageway system, which has proven to be an advantage. It will be apparent that substantially any passageway network may be provided for the dump body 42 for dispersing the warm exhaust gases therethrough in order to heat the body 42.

As long as the dump body 42 is in the normal or loading position, as depicted in the drawings, the exhaust gases from the vehicle engine move rearwardly through the first exhaust system portion 30 and through the dynamic sealing unit 196 to the second exhaust system portion 70. The sealing unit 196 efficiently precludes leakage of the gases at the king post hinge section 14, regardless of the disposition of the trailer section 16 with respect to the tractor section 12. The hot exhaust gases are transmitted to the passageway system 72 through the apertured boss 242 which is in direct communication with the open end 238 of the leg portion 236. Leakage of the exhaust gases at this point is precluded by the sealing member 253. It is to be noted that the gases moving through the sleeve or leg portion 236 are not under extreme pressure conditions and tend to flow readily into the open boss 242. Therefore, the sealing pressure between the leg 236 and the sleeve 246 need not be exceedingly great.

When the hydraulic or pneumatic cylinders 64 are actuated, as is well known, for pivoting the dump body 42 toward the dumping or unloading position (not shown), the boss 242 moves substantially upwardly with respect to the leg 236, carrying the ring or sleeve 240 therewith. Thus, during the actual dumping operation, the exhaust gases will flow through the open end 238 to the atmosphere and will not be transferred to the passageway system 72. The dumping operation normally does not require any appreciable amount of time, particularly since the power for the pivoting of the dump body 42 is supplied by the cylinders 64. The relatively short period of time required for unloading the body 42 will normally not be sufficient for a complete discharge of the warm gases contained within the passageway system 72, thus assuring that the body 42 will remain sufficiently warm to preclude any freezing of the material carried therein. Of course, as the body 42 is pivoted toward the dumping position, the ring 240 will be disconnected from any engagement with the flange 248. The springs 252 will tend to raise the flange 248 since the downward force of the ring 240 is removed therefrom. However, the stop members 251 will preclude any accidental loss of the ring 246.

After the dumping or unloading operation has been completed, the cylinders 64 are actuated in the usual manner for pivoting the body 42 toward the normal position therefor. As the body 42 approaches the lowered or loading position, the sleeve 240 moves downwardly over the leg 236 until the lower end 266 thereof (FIG. 12) comes into contact with the flange 248. A continued lowering of the body 42 will urge the ring 240 against the flange 248 with sufficient pressure for acting against the force of the springs 252, thus assuring a metal to metal sealing between the end 266 and the flange 248. As hereinbefore set forth, the pressure of the exhaust gases flowing through the leg 236 and into the boss 242 is not great, thus the metal to metal seal combined with the sealing of the packing member 253 will substantially preclude leakage of the gases therethrough.

*Shifting Mechanism*

Referring now to FIGS. 13 through 18, the shifting mechanism, generally indicated at 270, is relatively simple and is particularly designed and constructed to be positive in operation. In other words, manual shifting in a forward direction by the operator results in forward movement of the vehicle 10. Conversely, manual shifting in a rearward direction results in a reverse direction of movement for the vehicle. The vehicle 10 is driven by the individual wheel motors 32 and 40, which are provided with electric energy from the generator (not shown) as hereinbefore set forth, thus no gearing is necessary for the shifting apparatus 270.

The shifting mechanism 270 comprises a vehicle shift lever 272 and a dump body shift lever 274 mounted with suitable housings 276 and 278, respectively, which are disposed within the cab 22 of the tractor section 12. A shaft 280 (FIG. 13) extends between the levers 272 and 274, and is provided with a stationary flange member 282 rigidly secured thereto and preferably substantially centrally disposed thereon. A sleeve or cylinder 284 is journalled on the shaft 280 to the right of the flange 282, as viewed in FIG. 13, by a pair of spaced needle bearings 286. A second sleeve or cylinder 288 is similarly journalled on the shaft 280 to the left of the flange 282 by spaced needle bearings 290. The sleeves 284 and 288 are retained on the shaft 280 by a pair of opposed support members 292 and 294, respectively. It will be apparent that the cylinders 284 and 288 are thus freely and independently rotatable on the shaft 280.

The vehicle shift lever 272 is preferably of a sectional or two part construction and is rigidly secured at one end to the outer periphery of the cylinder 284 in any suitable manner, and extends upwardly therefrom through an elongated opening or slot 296 provided on the housing 276. The upper section of the shift lever 272 is preferably pivotally connected to the lower section thereof at 297 (FIGURES 13 and 14). A helical spring 298 is suitably secured or anchored between the upper and lower sections of the two part lever 272 for urging the lever 272 toward the locking notches or stop members, as will be hereinafter set forth. One end of a link member 300 (FIG. 14) is pivotally secured at 302 to the lever 272, and the opposite end thereof is pivotally secured at 304 to a switch lever 306. The link arm 300 responds to the movement of the lever 272 for moving the switch lever 306 around the pivot connection 308 for actuation of a plurality of switch members 310. The switches 310 are suitably mounted on a switch base or plate 312 and are interposed in the electrical wiring system (not shown) of the vehicle 10 in any well known manner whereby the output of the generator to the motors 32 and 40 may be varied.

The slot 296 is provided with a plurality of stop members 314, 315, 316 and 317 (FIG. 17) indicating the high, low and two neutral positions, respectively, for the forward driving of the vehicle. An additional stop member 318 is provided for the reverse driving position. When the shifting lever 272 is manually pushed in a forward direction by the operator of the vehicle 10, the lever 272 pivots around the shaft 280 and moves within the slot 296 toward the stop 314, which will simultaneously move the link 300 and switch lever 306 for actuating the particular switch 310 whereby the proper drive contact circuit is selected as desired. With the shifting lever 272 positioned adjacent the stop 315, the particular switch 310 will be activated for providing the desired electrical connection for the motors 32 and 40. With the shifting lever 272 positioned in either of the stop positions 316 or 317, the motors 32 and 40 will be placed in neutral. As hereinbefore set forth, the shifting lever 272 tends to remain in the particular selected position due to the action of spring 298, and in the event the lever is accidentally removed from position adjacent one of the stop members, the lever will tend to return to the neutral position, thus providing a safety feature.

When the shifting lever 272 is manually pulled in a rearward direction and positioned adjacent the stop 318, the link member 300 will be simultaneously moved for rotating the switch lever to the switch 310 for activation of the motors 32 and 40 in a reverse direction, thus providing for a reverse movement of the vehicle 10. A flange member 320 (FIG. 14) is carried by the shifting lever 272, and is provided with an adjustable stop member 322 therein. The stop member 322 is moved in a direction toward a pivotal bar member 324 (FIG. 16) when the shifting lever 272 is moved toward the reverse position thereof. The pivotal bar 324 is disposed slightly rearwardly of the lever member 272 and is preferably pivotally secured at 326 between the stationary flange 282 and a block 328 (FIG. 14) spaced rearwardly therefrom. When the shifting lever 272 is in the reverse position, the stop member 322 strikes the end 330 of the bar 324 and pivots the bar in a clockwise direction as viewed in FIG. 16. It will be apparent that the end 330 of the bar 324 will thus be depressed while the opposite end 332 thereof will be elevated for a purpose as will be hereinafter set forth.

The dump body shift lever 274 is rigidly secured to the outer periphery of the cylinder 288 and extends upwardly therefrom through a slot 334 provided in the housing 278. The slot 334 is provided with a plurality of indicated positions (FIG. 18) such as R for raise, H for hold, F for float and L for lower. A yoke member 336 (FIG. 15) is pivotally secured at 338 to a flange member 340 which is carried by the lever 274. The yoke 336 is secured to a clevis member 342, which in turn is pivotally secured at 344 to a piston member 346. The piston 346 controls the supply of fluid to the cylinders 64 in any well known manner (not shown) for the lowering and raising of the dump body 42.

When the lever 274 is manually pulled in a reverse direction by the operator of the vehicle, the lever 274 will pivot about the shaft 280 and move toward the position R, or raise, whereby the yoke member 336 cooperates with the clevis 342 for actuating the piston 346 to supply the fluid to the cylinders 64 whereby the dump body 42 will be elevated or pivoted to the dumping or unloading position (not shown). When the dump body 42 reaches the unloading position, the lever 274 may be moved to the H, or hold position, whereby the dump body will be held in the unloading position. When the lever 274 is moved forwardly to the L, or lower position therefor, the yoke 336 and clevis 342 will actuate the piston 346 for releasing the fluid from the cylinders 64 whereby the dump body 42 will be lowered to the loading position. The lever 274 will tend to remain in the F or float position, since this is the position of least resistance, and there will be no actuation of the dump body 42 whatsoever in this position of the lever 274.

A stop member 322a similar to the stop member 322 is carried by a flange 320a provided on the dump body shift lever 274, and in the reverse, or raised position of the lever 274, the stop member will be brought into contact with the end 332 of the pivotal bar 324. In this manner, the bar 324 will be moved in a counter-clockwise direction about pivot 326 whereby the end portion 332 thereof will be depressed and the end portion 330 thereof will be elevated. This is a safety feature to provide for movement from the reverse position of the vehicle shift lever 272 with the shifting of the dump body lever 274 to the raised or dumping position. For example, as long as the dump body lever 274 is in the raised position, the end 330 of the bar 324 will be elevated. If the vehicle shift lever is in a reverse position, the stop member 322 will contact the elevated end portion 330 whereby the shift lever will be automatically kicked or knocked out of the reverse position. Thus, when an operator has backed the vehicle to the dumping area and shifts the dump body lever 274 for moving the dump body to the raised position, the vehicle shifting lever cannot remain in the reverse position. This is a safety feature to preclude an accidental backing over the edge of a cliff, or the like, when the operator applies power to raise the dump body. It is to be noted that the raising or lowering of the dump body 42 is rapid due to the hydraulic or pneumatic operation thereof by the cylinders 64. Thus, the dump body 42 will lower substantially immediately upon the movement of the shift lever to the L or lower and float position therefor.

Summary of Operation

By way of summary, the vehicle 10 comprises three basic components, namely a front tractor section 12, a king post hinge section 14 and a rear trailer section 16. The king post hinge section 14 is particularly designed and constructed to interconnect the cab section 12 and trailer section 16 in a manner to provide independent oscillation therebetween, thus greatly facilitating the maneuvering of the vehicle. Each wheel of the vehicle is independently powered by a motor disposed entirely within the rim thereof, thus eliminating the need for rigid alignment therebetween. This permits a versatility of operation and handling ease whereby the overall operation of the vehicle is substantially the same as the driving or operation of a smaller truck or automobile.

The exhaust gases from the vehicle engine are directed rearwardly for heating of the dump body to preclude freezing of the material carried therein. The gases are directed from the engine through the seal member 140 and through the flexible tubing 174 to the king post section 14. The hot gases then pass through the rotating seal assembly 196 and are directed through the exhaust system portion 70 to the passageway network 72 provided in the dump body 42. In this manner, the dump body is efficiently heated by the exhaust gases which are normally wasted. The connection or communication between the exhaust system portion 70 and the passageway network 72 is broken when the body 42 is in the raised or unloading position, but the communication therebetween is efficiently restored upon a lowering of the dump body to the loading position.

The vehicle shifting mechanism is simple and efficient and is particularly designed and constructed for operation in a positive manner. A forward movement of the vehicle shifting lever results in a forward direction of movement for the vehicle, and conversely, a reverse movement of the shifting lever results in a reverse direction of movement for the vehicle. Similarly, the shifting mechanism for the raising and lowering of the dump body 42 is of a positive action. For example, a forward movement of the dump body shifting lever results in the lowering of the dump body to the normal loading position, whereas a reverse movement of the shifting lever results in the elevating of the dump body to the unloading position. In addition, the shifting mechanism is provided with a means for movement from a reverse position of the vehicle shifting lever when the dump body is in the unloading position. This is a particular safety feature to substantially eliminate an accidental backing of the truck or rearward tipping thereof during the unloading operation, which could cause a serious accident.

A dynamic braking system is provided for the vehicle 10 wherein the wheel motors are reversed in operation to function as generators for providing braking effort. The dynamic braking is more efficient and reduces wear normally present in mechanical or friction braking devices.

From the foregoing, it will be apparent that the present invention provides a novel off-highway vehicle of the dump body type particularly designed and constructed of an extremely large size for increasing the pay load for each haul, and reducing the haulage time. The oversized vehicle is provided with an all wheel drive which increases the power thereof, and is especially maneuverable, particularly for such a large vehicle. The hot exhaust gases, which are normally wasted, are directed to the dump body for circulation therearound to preclude freezing of the material carried therein. In addition, a safety feature is provided to substantially preclude accidental retaining of the reverse drive position of the vehicle engine during the unloading or dumping operation. The vehicle is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In an off-highway vehicle, a front cab section, a rear trailer section, a king post hinge section interconnecting the cab section and trailer section, said king post hinge section comprising a frame interposed between the cab section and trailer section, a pair of spaced downwardly extending flange members carried by the frame, a shaft extending between the flange members, said shaft journalled to the cab section whereby the cab section may pivot thereabout to permit independent lateral oscillation of the cab section with respect to the frame during operation of the vehicle, a second pair of spaced downwardly extending flange members carried by the frame and spaced rearwardly from the first flange members, a second shaft extending between the second flange members and in axial alignment with the first shaft member, said second shaft journalled to the cab section for cooperating with the first shaft to provide the axis of oscillation for the cab section, a pair of aligned substantially vertical pivot pins carried by the frame and journalled to the trailer section whereby the trailer section may rotate there around independent of the frame and cab section, and self-aligning bearing means interposed between the frame and the pivot pins to compensate for any motion of the trailer section with respect thereto.

2. In an off-highway vehicle, a front cab section, a rear trailer section, a king post hinge section interconnecting the front cab section and the rear trailer section, shaft means carried by the king post hinge section and journalled to the front cab section to provide for oscillation of the front cab section independently from the king post hinge section, pivot pins means carried by the king post hinge section and journalled on the rear trailer section to provide for variable angular dispositions between the rear trailer section and front cab section, an exhaust system extending from the front cab section to the rear trailer section for directing hot exhaust gases of the vehicle thereto, means provided in the exhaust system to compensate for the independent oscillation of the cab section and trailer section, rotating seal means interposed in the exhaust system at the king post hinge section to preclude leakage of the exhaust gases, and seal means carried by the exhaust system to preclude leakage of the exhaust gases between the exhaust system and the rear trailer section.

3. In an off-highway vehicle, a front cab section, a rear trailer section, a king post hinge section interconnecting the cab section and trailer section, said king post hinge section comprising a frame interposed between the cab section and trailer section, a pair of spaced downwardly extending flange members carried by the frame, a shaft extending between the flange members, said shaft journalled to the cab section whereby the cab section may pivot thereabout to permit independent lateral oscillation of the cab section with respect to the frame during operation of the vehicle, a second pair of spaced downwardly extending flange members carried by the frame and spaced rearwardly from the first flange members, a second shaft extending between the second flange members and in axial alignment with the first shaft member, said second shaft journalled to the cab section for cooperating with the first shaft to provide the axis of oscillation for the cab section, a pair of aligned substantially vertical pivot pins carried by the frame and journalled to the trailer section whereby the trailer section may rotate therearound independent of the frame and cab section, self-aligning bearing means interposed between the frame and the pivot pins to compensate for any motion of the trailer section with respect thereto, a dump body pivotally secured on the rear trailer section, vehicle shifting means carried by the front cab section and operable to provide forward and reverse driving directions for the vehicle, dump body shifting means carried by the front cab section and operable to provide alternate loading and unloading positions for the dump body, and means cooperating between the said vehicle shifting means and dump body shifting means for precluding accidental retaining of the vehicle shifting means in the reverse driving direction when the dump body is in the unloading position.

4. In a dump vehicle, a tractor section, a trailer section having a dump body pivotally secured thereon, a king post hinge section interconnecting the tractor section and trailer section by means of vertical and horizontal pivot shaft means to provide for independent oscillation of the tractor and trailer sections and variable angular dispositions therebetween, a passageway network provided on the dump body and having inlet and outlet means therefor, an exhaust system extending from the tractor section to the dump body for directing hot exhaust gases to the passageway network, said exhaust system comprising a flexible conduit means carried by the tractor section for receiving the hot exhaust gases from the vehicle, a sleeve carried by the flexible conduit means and rigidly secured to the tractor section, a rotatable pipe member in communication with the rigid sleeve, seal means interposed between the rotatable pipe and the rigid sleeve, a flexible conduit carried by the rotatable sleeve and having one end rigidly secured to the king post hinge section, brace means provided on the second flexible conduit for precluding twisting thereof during oscillation of the tractor section, a sleeve carried by the king post hinge section and secured to the second flexible conduit for rigidly securing thereof to the king post hinge section, a rotatable sleeve in communication with said last mentioned sleeve, seal means interposed between the second rotatable sleeve and the last mentioned sleeve, rigid conduit means secured to the second rotatable sleeve and extending into communication with the passageway network, and seal means carried by the rigid conduit means for precluding leakage of the exhaust gases between the rigid conduit means and the passageway network.

5. In an off-highway vehicle, a front cab section, a rear trailer section, a king post hinge section interconnecting the front cab section and rear trailer section, shaft means carried by the king post hinge section and journalled to the front cab section to provide for oscillation of the front cab section independently from the king post hinge section, vertical pivot pin means carried by the king post hinge section and journalled to the rear trailer section to provide for variable angular dispositions between the rear trailer section and the front cab section, a dump body pivotally secured on the rear trailer section, a passageway network provided on the dump body, an exhaust system extending from the front cab section to the dump body and in communication with the passageway network for directing hot exhaust gases of the vehicle thereto, means provided in the exhaust system to compensate for the independent oscillation of the cab section with respect to the trailer section, rotating seal means interposed in the exhaust system at the king post hinge section to preclude leakage of the exhaust gases between the exhaust system and the passageway network, vehicle shifting means carried by the front cab section and operable to provide forward and reverse driving directions for the vehicle, dump body shifting means carried by the front cab section and operable to provide alternate loading and unloading positions for the dump body, and means cooperating between the said vehicle shifting means and dump body shifting means for precluding accidental retaining of the vehicle shifting means in the reverse driving direction when the dump body is in the unloading position.

6. In an off-highway dump vehicle, a cab section, a trailer section, a king post hinge section interconnecting the cab and trailer sections, said king post hinge section comprising a frame interposed between the cab and trailer sections, a shaft carried by the frame and journalled to the cab section, a second shaft carried by the frame and in axial alignment with the first shaft, said second shaft journalled to the cab section and cooperating with the first shaft whereby the cab section may rotate laterally independentlyy of the frame and trailer section, vertical pivot pin means carried by the frame and journalled to the trailer section whereby the trailer section may rotate therearound, self-aligning bearing means cooperating between the frame and the pivot pin to compensate for any motion of the trailer section with respect thereto, a dump body pivotally secured to the trailer section, an exhaust system extending from the cab section to the dump body for directing hot exhaust gases of the vehicle thereto, rotating seal means provided in the exhaust system at the king post hinge section, seal means provided in the exhaust system to preclude leakage of the exhaust gases at the dump body, means provided in the exhaust system to compensate for the lateral rotation of the cab section, vehicle shifting means provided in the cab section and operable to provide forward and reverse driving directions therefor, dump body shifting means provided in the cab section and operable to provide alternate positions for loading and unloading therefor, and means cooperating between the vehicle shifting means and the dump body shifting means for precluding accidental retaining of the vehicle shifting means in the reverse driving direction when the dump body is in the unloading position.

7. In an off-highway dump vehicle, a cab section, a trailer section, a king post hinge section interconnecting the cab and trailer sections, said king post hinge section comprising a frame interposed between the cab and trailer sections, a shaft carried by the frame and journalled to the cab section, a second shaft carried by the frame and in axial alignment with the first shaft, said second shaft journalled to the cab section and cooperating with the first shaft whereby the cab section may rotate laterally independently of the frame and trailer section, vertical pivot pin means carried by the frame and journalled to the trailer section whereby the trailer section may rotate therearound, self-aligning bearing means cooperating between the frame and the pivot pin means to compensate for any movement of the trailer section with respect thereto, a dump body pivotally secured to the trailer section, an exhaust system extending from the cab section to the dump body for directing hot exhaust gases of the vehicle thereto, a shifting apparatus provided on the cab section to permit variable driving directions for the vehicle and comprising a shaft, a rotatable sleeve journalled on one end of the shaft, a vehicle shifting lever carried by the sleeve and rotatable therewith, a second sleeve journalled on the opposed end of the shaft, a dump body shifting lever carried by the second sleeve and rotatable therewith, link means carried by the vehicle shifting lever for actuation of the vehicle to provide reverse and forward driving directions therefor upon rotation of the vehicle shifting lever, means carried by the dump body shifting lever for pivoting of the dump body to alternate unloading and loading positions upon rotation of the dump body shifting lever, a pivotal bar disposed between the shifting levers, and stop means carried by the shifting levers and cooperating with the pivotal bar to preclude accidental retaining of the vehicle shifting lever in the reverse driving position when the dump body is in the unloading position.

8. In an off-highway dump vehicle, a front cab section, a rear trailer section, a king post hinge section interconnecting the cab and trailer sections, said king post hinge section comprising a frame interposed between the cab and trailer sections, a shaft carried by the frame and journalled to the cab section, a second shaft carried by the frame and in axial alignment with the first shaft, said second shaft journalled to the cab section and cooperating with the first shaft whereby the cab section may rotate laterally independently of the frame and trailer section, vertical pivot pin means carried by the frame and journalled to the trailer section whereby the trailer section may rotate therearound, self-aligning bearing means cooperating between the frame and the pivot pin means to compensate for any movement of the trailer section with respect thereto, a dump body pivotally secured to the trailer section, passageway means provided on the dump body, an exhaust system extending from the cab section to the dump body and in communication with the passageway means for directing hot exhaust gases of the vehicle thereto, means provided in the exhaust system to compensate for the lateral oscillation of the cab section, rotating seal means interposed in the exhaust system at the king post hinge section, seal means carried by the exhaust system to preclude leakage of the exhaust gases at the passageway means, a shifting apparatus provided in the cab section to permit variable driving directions for the vehicle and comprising a shaft, a rotatable sleeve journalled on one end of the shaft, a vehicle shifting lever carried by the sleeve and rotatable therewith, a second sleeve journalled on the opposed end of the shaft, a dump body shifting lever carried by the second sleeve and rotatable therewith, link means carried by the vehicle shifting lever for actuation of the vehicle to provide reverse and forward driving directions therefor upon rotation of the vehicle shifting lever, means carried by the dump body shifting lever for pivoting of the dump body to alternate unloading and loading positions upon rotation of the dump body shifting lever, a pivotal bar disposed between the shifting levers, and stop means carried by the shifting levers and cooperating with the pivotal bar to preclude accidental retaining of the vehicle shifting lever in the reverse driving position when the dump body is in the unloading position.

References Cited in the file of this patent

UNITED STATES PATENTS

| | | |
|---|---|---|
| 1,091,733 | Cook | Mar. 31, 1914 |
| 1,104,446 | Pfouts | July 21, 1914 |
| 1,168,218 | Merritt | Jan. 11, 1916 |
| 1,191,983 | Mueller | July 25, 1916 |
| 2,156,601 | Mosling et al. | May 2, 1939 |
| 2,165,507 | Rasmussen | July 11, 1939 |
| 2,233,193 | Armington et al. | Feb. 25, 1941 |
| 2,721,097 | Rittenhouse | Oct. 18, 1955 |
| 2,833,556 | Kling | May 6, 1958 |

FOREIGN PATENTS

| | | |
|---|---|---|
| 594,801 | Canada | Mar. 22, 1960 |
| 778,255 | Great Britain | July 3, 1957 |
| 404,214 | Germany | Oct. 16, 1924 |
| 914,464 | Germany | July 1, 1954 |